(12) United States Patent
Seo et al.

(10) Patent No.: US 9,769,800 B2
(45) Date of Patent: Sep. 19, 2017

(54) METHOD AND APPARATUS FOR ALLOCATING CONTROL CHANNEL FOR TRANSCEIVING DATA BETWEEN DEVICES IN WIRELESS ACCESS SYSTEM

(71) Applicant: LG Electronics Inc., Seoul (KR)

(72) Inventors: Daewon Seo, Anyang-si (KR); Hakseong Kim, Anyang-si (KR); Hanbyul Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/408,383

(22) PCT Filed: Jul. 12, 2013

(86) PCT No.: PCT/KR2013/006277
§ 371 (c)(1),
(2) Date: Dec. 16, 2014

(87) PCT Pub. No.: WO2014/010996
PCT Pub. Date: Jan. 16, 2014

(65) Prior Publication Data
US 2015/0195823 A1   Jul. 9, 2015

Related U.S. Application Data

(60) Provisional application No. 61/671,080, filed on Jul. 12, 2012.

(51) Int. Cl.
*H04W 72/04*   (2009.01)
(52) U.S. Cl.
CPC .............................. *H04W 72/0406* (2013.01)

(58) Field of Classification Search
CPC ......... H04W 72/1278; H04W 72/0406; H04W 24/10; H04W 72/082; H04L 5/0053; H04J 11/005
See application file for complete search history.

(56) References Cited

U.S. PATENT DOCUMENTS

| | | | |
|---|---|---|---|
| 2011/0085513 A1* | 4/2011 | Chen ................... | H04W 72/042 370/330 |
| 2011/0110441 A1* | 5/2011 | Chen ................... | H04L 5/0007 375/260 |

(Continued)

FOREIGN PATENT DOCUMENTS

| | | |
|---|---|---|
| WO | 2010-077121 A2 | 7/2010 |
| WO | 2010-097645 A1 | 9/2010 |

*Primary Examiner* — Jung-Jen Liu
(74) *Attorney, Agent, or Firm* — Dentons US LLP

(57) ABSTRACT

Disclosed are a method and an apparatus for transceiving a control channel for performing device-to-device (D2D) communication in a wireless access system that supports D2D communication. More particularly, the method for transmitting a control channel by a transmitter side D2D communication device according to one embodiment of the present invention comprises: a step of allocating the resource region to be used in the D2D communication by a base station; and a step of transmitting the control channel to a receiver side D2D communication device through the control channel bandwidth which is a portion of the bandwidth of the allocated resource region. The time resource of the resource region may be a resource region to be allocated for transmission via the physical downlink shared channel (PDSCH) from the base station.

12 Claims, 9 Drawing Sheets

(56) References Cited

U.S. PATENT DOCUMENTS

| | | |
|---|---|---|
| 2011/0235584 A1* | 9/2011 | Chen ................. H04L 1/008 370/328 |
| 2011/0268046 A1 | 11/2011 | Choi et al. |
| 2011/0310856 A1* | 12/2011 | Hariharan ............ H04L 1/1607 370/336 |
| 2012/0063369 A1* | 3/2012 | Lin ................... H04B 7/15542 370/279 |
| 2012/0082022 A1* | 4/2012 | Damnjanovic ........ H04J 11/005 370/201 |
| 2012/0083283 A1 | 4/2012 | Phan et al. |
| 2012/0106517 A1 | 5/2012 | Charbit et al. |
| 2013/0003639 A1* | 1/2013 | Noh .................. H04L 5/0053 370/312 |
| 2013/0230015 A1* | 9/2013 | Hoymann ............ H04L 5/0053 370/329 |

* cited by examiner

METHOD AND APPARATUS FOR ALLOCATING CONTROL CHANNEL FOR TRANSCEIVING DATA BETWEEN DEVICES IN WIRELESS ACCESS SYSTEM

This Application is a 35 U.S.C. §371 National Stage entry of International Application No. PCT/KR2013/006277, filed Jul. 12, 2013, which claims benefit of Provisional Application No. 61/671,080 filed Jul. 7, 2012, both of which are incorporated by reference in their entirety herein.

TECHNICAL FIELD

The present invention relates to a wireless access system, and more particularly, to a method and apparatus for allocating a control channel for transmitting and receiving data between devices in a wireless access system for supporting device-to-device (D2D) communication.

BACKGROUND ART

In order to perform communication, a user equipment (UE) present in a cell of cellular communication accesses a base station (BS), receives control information for transmitting and receiving data to and from a base station (BS), and then transmits and receives data to and from the BS. That is, since the UE transmits and receives data through the BS, the UE transmits data of the UE to the BS in order to transmit data to another cellular UE, and the BS that receives the data transmits the received data to another UE. As such, in order to transmit data from one UE to another UE, the data can be transmitted only through the BS, and thus the BS performs scheduling on a resource and channel for data transmission and reception and transmits channel and resource scheduling information to each UE. For communication between UEs through the BS, each UE requires channel and resource allocation for data transmission and reception from the BS, but device-to-device (D2D) communication is configured in such a way that a UE directly transmits and receives a signal to and from a target UE subjected to data transmission without a BS or a relay.

D2D communication is a distribute communication scheme for directly transmitting traffic between adjacent nodes without infrastructure such as a BS. In a D2D communication environment, each node such as a portable UE, etc. searches for another physically adjacent UE, configures communication sessions, and then transmits the traffic. As such, D2D communication can distribute traffic concentrated on an eNB to overcome traffic overload, and thus has drawn attention as main technology of post-4G next-generation mobile communication technology. For this reason, standardization institutes such as 3GPP, IEEE, etc. have established D2D communication standards based on LTE-A or Wi-Fi and Qualcomm, etc. have developed independent D2D communication technology.

DISCLOSURE

Technical Problem

An object of the present invention devised to solve the problem lies in a wireless access system, more particularly, a method and apparatus for allocating a control channel for transmitting and receiving data between devices in a wireless access system for supporting device-to-device (D2D) communication.

It is to be understood that both the foregoing general description and the following detailed description of the present invention are exemplary and explanatory and are intended to provide further explanation of the invention as claimed.

Technical Solution

The object of the present invention can be achieved by providing a method for transmitting a control channel by a device-to-device (D2D) device at a transmitter side in a wireless access system for supporting D2D communication, the method including being assigned a resource region to be used in the D2D communication by a base station (BS), and transmitting the control channel to a D2D device at a receiver side through a control channel bandwidth as a partial bandwidth of a bandwidth of the allocated resource region, wherein a time resource of the resource region is a resource region allocated to transmission of a physical downlink shared channel (PDSCH) from the BS.

The resource region allocated by the BS may be allocated based on a channel quality indicator (CQI) received from the D2D device at the receiver side by the BS A bandwidth of the allocated resource region may be divided into a plurality of unit bandwidths, the method may further include receiving at least one aggregation level (AL) set indicating the number of the unit bandwidths used for transmission of the control channel from the BS, and the transmitting may include transmitting the control channel based on the at least one AL set.

The method may further include receiving AL set identification information indicating an AL set to be used for transmission of the control channel of the at least one AL set, from the BS, wherein the number of at least one AL set may be determined based on a bit number of the AL set identification information.

The control bandwidth may be hopped in the allocated bandwidth with a predetermined rule according to a predetermined time interval.

The predetermined rule may be UE-specific to at least one of the D2D device at the transmitter side and the D2D device at the receiver side The predetermined rule may be UE-specific with regard to an initial value set for a predetermined hopping function or is UE-specific.

The predetermined rule may divide the allocated bandwidth into a plurality of bandwidth groups, allocate the control channel bandwidth in a predetermined bandwidth group belonging to the bandwidth groups, and include a group hopping rule for hopping the predetermined bandwidth group in the allocated bandwidth.

The predetermined rule may divide the predetermined bandwidth group into a plurality of unit bandwidths and include a bandwidth hopping rule for hopping the unit bandwidths in the predetermined bandwidth group In another aspect of the present invention, provided herein is a method for receiving a control channel by a device-to-device (D2D) device at a receiver side in a wireless access system for supporting D2D communication, the method including being assigned a resource region to be used in the D2D communication by a base station (BS), and receiving the control channel from a D2D device at a transmitter side through a control channel bandwidth as a partial bandwidth of a bandwidth of the allocated resource region, and a time resource of the resource region is a resource region allocated to transmission of a physical downlink shared channel (PDSCH) from the BS.

In another aspect of the present invention, provided herein is a device-to-device (D2D) device at a transmitter side for transmitting a control channel in a wireless access system for supporting D2D communication, the D2D device including a radio frequency (RF) unit and a processor configured to control the RF unit, wherein the processor is assigned a resource region to be used in the D2D communication by a base station (BS) and transmits the control channel to a D2D device at a receiver side through a control channel bandwidth as a partial bandwidth of a bandwidth of the allocated resource region, and a time resource of the resource region is a resource region allocated to transmission of a physical downlink shared channel (PDSCH) from the BS.

In another aspect of the present invention, provided herein is a device-to-device (D2D) device at a receiver side for receiving a control channel in a wireless access system for supporting D2D communication, the D2D device including a radio frequency (RF) unit, and a processor configured to control the RF unit, wherein the processor is assigned a resource region to be used in the D2D communication by a base station (BS) and receives the control channel from a D2D device at a transmitter side through a control channel bandwidth as a partial bandwidth of a bandwidth of the allocated resource region, and a time resource of the resource region is a resource region allocated to transmission of a physical downlink shared channel (PDSCH) from the BS.

Advantageous Effects

According to embodiments of the present invention, an effective communication environment can be provided by providing a method for device-to-device (D2D) communication in a wireless access system, preferably, in a wireless access system for supporting D2D communication.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

BEST MODE

Figure 1:
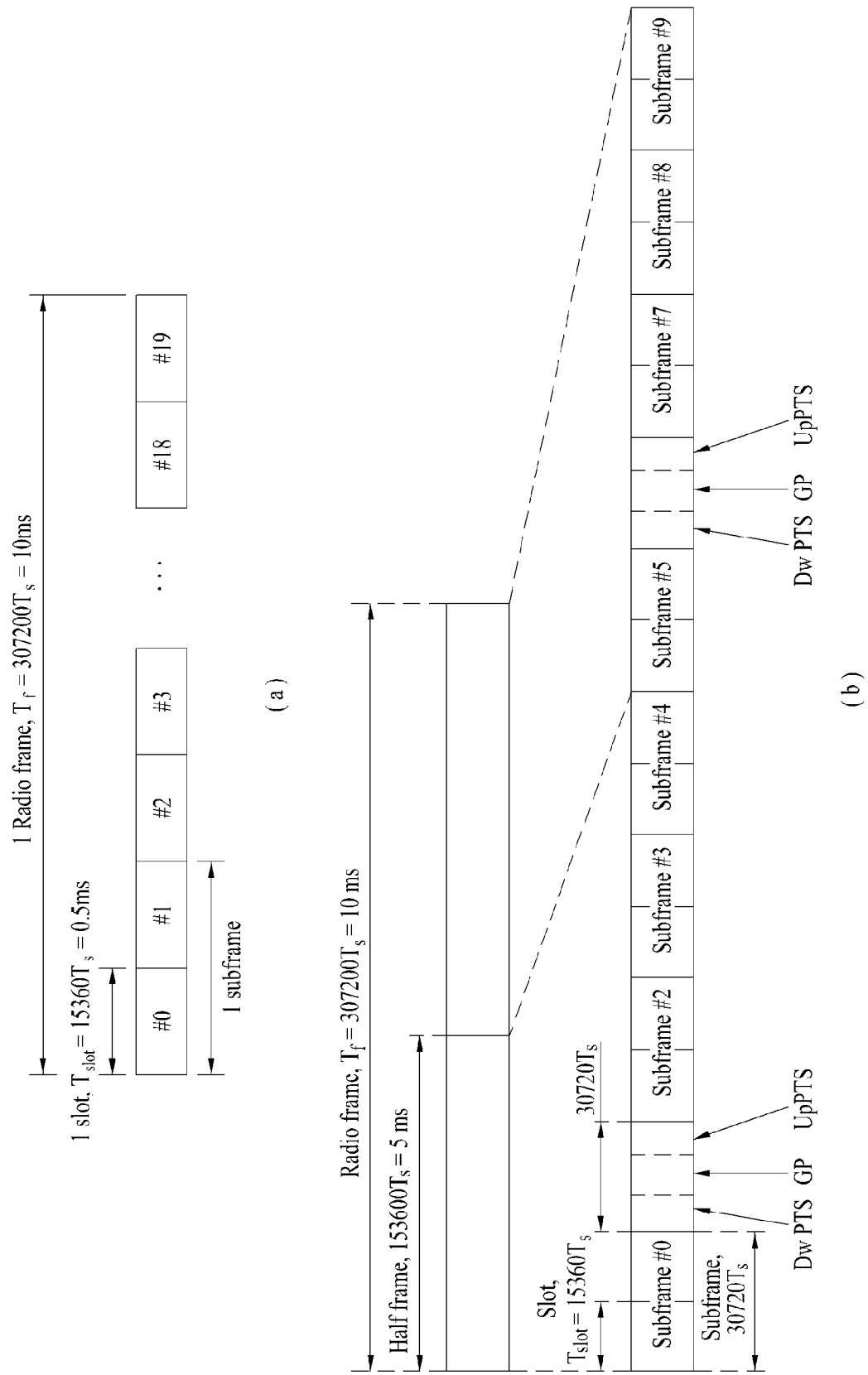
FIGS. 1 (*a*) and (*b*) illustrate exemplary radio frame structures used in a wireless communication system.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the invention. The same reference numbers will be used throughout this specification to refer to the same parts.

For convenience of description, the following detailed description is made in detail in terms of 3rd generation partnership project (3GPP) long term evolution (LTE) or 3GPP LTE-Advanced (LTE-A). However, the present invention can also be applied to other wireless communication systems as well as LTE/LTE-A.

In the present invention, a user equipment (UE) is fixed or mobile. The UE is a device that transmits and receives user data and/or control information by communicating with a base station (BS). The term 'UE' may be replaced with 'terminal equipment', 'mobile station (MS)', 'mobile terminal (MT)', 'user terminal (UT)', 'subscriber station (SS)', 'wireless device', 'personal digital assistant (PDA)', 'wireless modem', 'handheld device', etc. A BS is typically a fixed station that communicates with a UE and/or another BS. The BS exchanges data and control information with a UE and another BS. The term 'BS' may be replaced with 'advanced base station (ABS)', 'Node B', 'evolved-Node B (eNB or eNode B)', 'base transceiver system (BTS)', 'access point (AP)', 'processing server (PS)', etc. In the following description of the present invention, the BS will be consistently described.

In the present invention, a node refers to a fixed point capable of transmitting/receiving a radio signal to/from a UE by communication with the UE. Various types of eNBs can be used as nodes irrespective their names. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. The antenna may refer to a physical antenna, an antenna port, a virtual antenna or an antenna group. A node may also be called a point.

A cell refers to a predetermined geographical area to which one or more nodes provide a communication service in the present invention. Thus, communication with a specific cell may mean communication with an eNB or a node that provides a communication service to the specific cell in the present invention. A DL or UL signal of the specific cell is a DL or UL signal from or to the eNB or the node that provides a communication service to the specific cell. A channel state or quality of the specific cell refers to the channel state or quality of a channel or communication link established between a UE and the eNB or the node that provides a communication service to the specific cell. In a LTE/LTE-A system, a UE can measure downlink channel state from a specific node using cell-specific reference signal(s) (CRS(s)) transmitted through antenna port(s) of the specific node on a CRS resource allocated to the specific node and/or channel state information reference signal(s) (CSI-RS(s)) transmitted through antenna port(s) of the specific node on a CSI-RS resource.

The 3GPP LTE/LTE-A standard defines downlink physical channels corresponding to resource elements for carrying information originating from an upper layer, and downlink physical signals corresponding to resource elements that are used by a physical layer but do not carry the information originating from the upper layer. For example, a physical downlink shared channel (PDSCH), a physical broadcast channel (PBCH), a physical multicast channel (PMCH), a physical control format indicator channel (PCFICH), a physical downlink control channel (PDCCH), and a physical hybrid ARQ indicator channel (PHICH) are defined as downlink physical channels, and a reference signal (RS) and a synchronization signal are defined as downlink physical signals. An RS that is also called a pilot refers to a predefined signal with a special waveform, which is known to both a BS and a UE. For example, a cell specific RS, a UE-specific RS, a positioning RS (PRS), and a channel state information RS (CSI-RS) are defined as a downlink RS. The 3GPP LTE/LTE-A standard defines uplink physical channels corresponding to resource elements for carrying information originating from an upper layer, and uplink physical signals corresponding to resource elements that are used by a physical layer but do not carry the information originating from the upper layer. For example, a physical uplink shared channel (PUSCH), a physical uplink control channel (PUCCH), and a physical random access channel (PRACH) are defined as uplink physical channels, and a demodulation reference signal (DM RS) for uplink control/data signals and a sounding reference signal (SRS) used for uplink channel measurement are defined.

In the present invention, physical downlink control channel (PDCCH)/physical control format indicator channel (PCFICH)/physical hybrid automatic retransmit request indicator channel (PHICH)/physical downlink shared channel (PDSCH) may indicate a set of time-frequency resources or resource elements (REs) carrying downlink control information (DCI), a set of time-frequency resources or REs carrying control format indicator (CFI), a set of time-frequency resources or REs carrying downlink ACK/NACK (ACKnowlegement/Negative ACK), and a set of time-frequency resources or REs carrying DL data, respectively. In addition, physical uplink control channel (PUCCH)/physical uplink shared channel (PUSCH)/physical random access channel (PRACH) may indicate a set of time-frequency resources or REs carrying Uplink Control Information (UCI), a set of time-frequency resources or REs carrying UL data, and a set of time-frequency resources REs carrying a random access signal, respectively. In the present invention, time-frequency resource or RE that is as signed to or pertains to PDCCH/PCFICH/PHICH/PDSCH/PUCCH/PUSCH/PRACH may be called PDCCH/PCFICH/PHICH/PDSCH/PUCCH/PUSCH/PRACH RE or PDCCH/PCFICH/PHICH/PDSCH/PUCCH/PUSCH/PRACH resources. Accordingly, in the present invention, transmission of a PUCCH/PUSCH by a UE means that an uplink control information/uplink data/random access signal is transmitted on a PUCCH/PUSCH. In the present invention, transmission of PDCCH/PCFICH/PHICH/PDSCH by a BS means that downlink data/control information is transmitted on PDCCH/PCFICH/PHICH/PDSCH.

FIG. 1 illustrates an exemplary radio frame structure used in a wireless communication system.

In particular, FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms ($307200T_s$) and includes 10 subframes in equal size. The 10 subframes in the radio frame may be numbered. Here, $T_s$ denotes sampling time and is represented as $T_s=1/(2048*15 \text{ kHz})$. Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL config-uration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of downlink pilot timeslot (DwPTS), guard period (GP), and uplink pilot timeslot (UpPTS). DwPTS is a period reserved for downlink transmission and UpPTS is a period reserved for uplink transmission. Table 2 shows special subframe configuration.

TABLE 2

| | | Normal cyclic prefix in downlink | | | Extended cyclic prefix in downlink | |
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| --- | --- | --- | --- | --- | --- | --- |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

Figure 2:
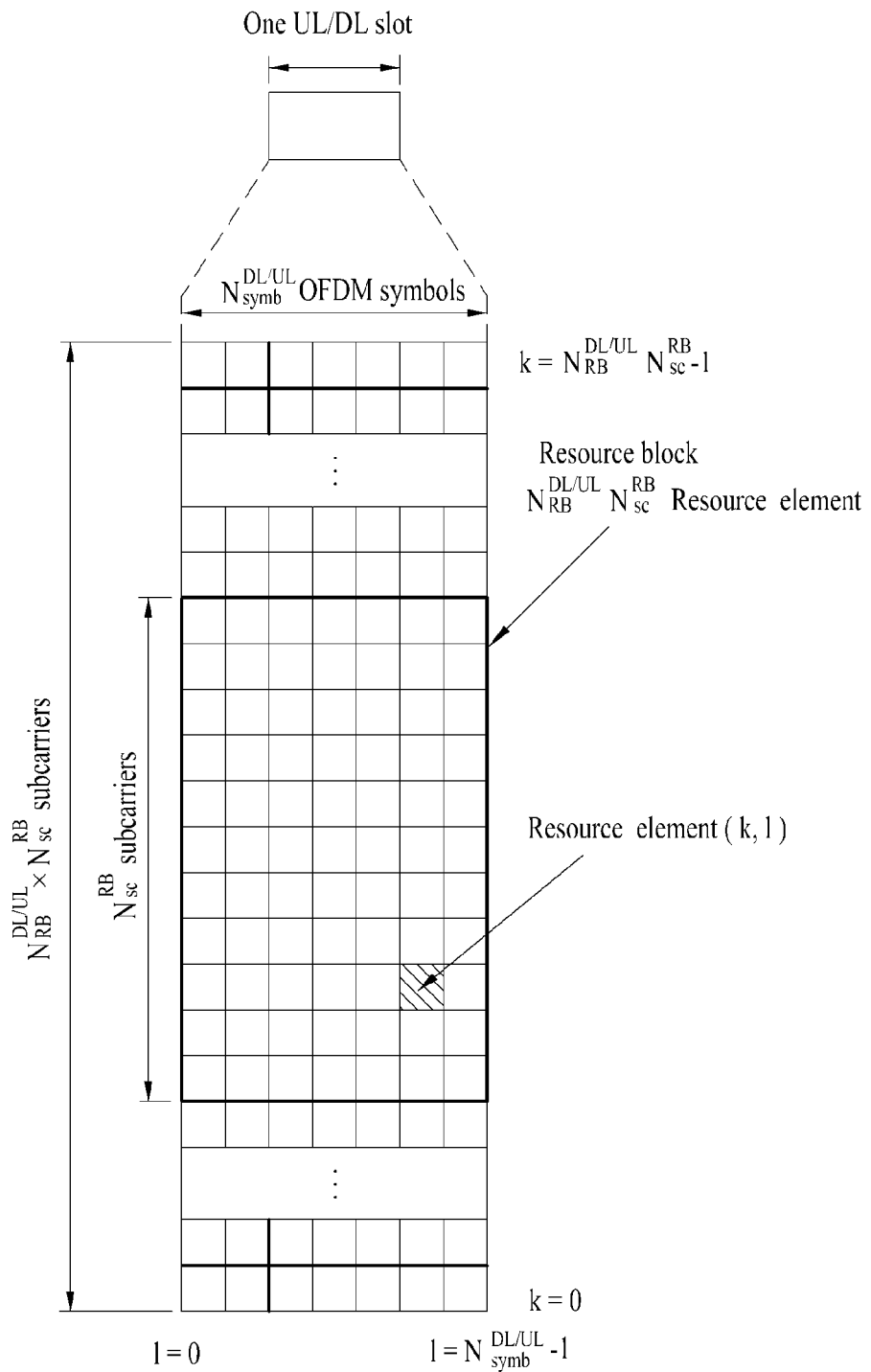
FIG. 2 illustrates an exemplary downlink (DL)/uplink (UL) slot structure in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of orthogonal frequency division multiplexing (OFDM) symbols in the time domain and a plurality of resource blocks (RBs) in the frequency domain. An OFDM symbol may refer to a symbol period. Referring to FIG. 2, a signal transmitted in each slot may be represented by a resource grid including $N^{DL/UL}_{RB} * N^{RB}_{sc}$ subcarriers and $N^{DL/UL}_{symb}$ OFDM symbols. Here, $N^{DL}_{RB}$ denotes the number of RBs in a downlink slot and $N^{UL}_{RB}$ denotes the number of RBs in an uplink slot. $N^{DL}_{RB}$ and $N^{UL}_{RB}$ respectively depend on a DL transmission bandwidth and a UL transmission bandwidth. $N^{DL}_{symb}$ denotes the number of OFDM symbols in the downlink slot and $N^{UL}_{symb}$ denotes the number of OFDM symbols in the uplink slot. In addition, $N^{RB}_{sc}$ denotes the number of subcarriers constructing one RB.

An OFDM symbol may be called an OFDM symbol or a single carrier frequency division multiplexing (SC-FDM) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N^{DL/UL}_{RB} * N^{RB}_{sc}$ subcarriers in the frequency domain. Subcarrier types can be classified into a data subcarrier for data transmission, a reference signal subcarrier for reference signal transmission, and null subcarriers for a guard band and a direct current (DC) component. The DC component is mapped to a carrier frequency (f0) during OFDM signal generation or frequency up-conversion. The carrier frequency is also called a center frequency (fc).

An RB is defined by $N^{DL/UL}_{symb}$ (e.g. 7) consecutive OFDM symbols in the time domain and $N^{RB}_{sc}$ (e.g. 12) consecutive subcarriers in the frequency domain. For reference, a resource composed by an OFDM symbol and a subcarrier is called a resource element (RE) or a tone. Accordingly, an RB includes $N^{DL/UL}_{symb} * N^{RB}_{sc}$ REs. Each RE in a resource grid can be uniquely defined by an index pair (k, 1) in a slot. Here, k is an index in the range of 0 to $N^{DL/UL}_{RB} * N^{RB}_{sc} - 1$ in the frequency domain and 1 is an index in the range of 0 to $N^{DL/UL}_{symb} - 1$.

An RB is mapped to each of one physical resource block (PRB) and one virtual resource block (VRB). The PRB is defined by $N^{DL/UL}_{symb}$ (e.g. 7) consecutive OFDM symbols or SC-FDM symbols in the time domain and defined by $N^{RB}_{sc}$ (e.g. 12) consecutive subcarriers in the frequency domain. Thus, one PRB includes $N^{DL/UL}_{symb} \times N^{RB}_{sc}$ REs. Two RBs that occupy $N^{RB}_{sc}$ consecutive subcarriers in a subframe and respectively disposed in two slots of the subframe are called a physical resource block (PRB) pair. Two. Two RBs constituting a PRB pair have the same PRB number (or PRB index).

In order to receive a signal from an eNB or transmit a signal to the eNB, a UE needs to synchronize time/frequency of the UE with time/frequency of the eNB. This is because that when the US is synchronized with the eNB, the UE can determine time and frequency parameters required to perform demodulation of DL signals and transmission of UL signal at an accurate time point.

Figure 3:
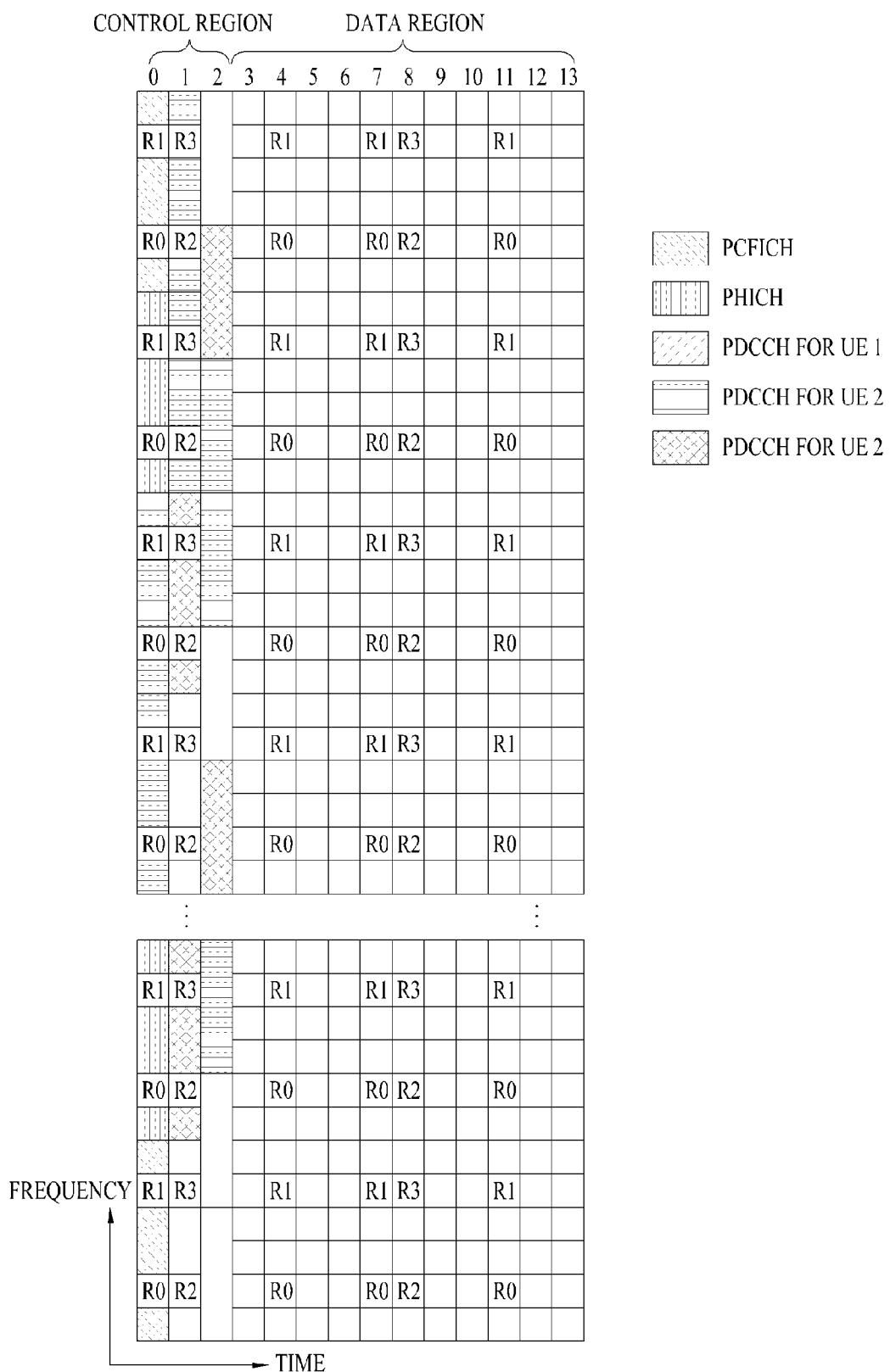
FIG. 3 illustrates exemplary control channels included in the control region of a subframe in a downlink radio frame.

FIG. 3 illustrates exemplary control channels included in the control region of a subframe in a downlink radio frame.

Referring to FIG. 3, a subframe includes 14 OFDM symbols. A control region occupies the first one to three OFDM symbols and a data region occupies the other 13 to 11 OFDM symbols in the subframe according to the configuration of the subframe. In FIG. 3, R1 to R4 denote reference signals (RSs) or pilot signals for antenna 0 to antenna 3. RSs are transmitted in a predetermined pattern within a subframe irrespective of the control region and the data region of the subframe. Control channels are allocated to resources unused for RSs in the control region, and traffic channels are allocated to resources unused for RSs in the data region. The control channels of the control region are a physical control format indicator channel (PCFICH), a physical hybrid-arq indicator channel (PHICH), physical downlink control channel (PDCCH), etc.

The PCFICH indicates the number of OFDM symbols used for PDCCHs in every subframe to UEs. The PCFICH is located in the first OFDM symbol and configured with priority over the PHICH and the PDCCHs. The PCFICH includes four resource element groups (REGs), each REG being distributed across the control region based on a cell Identity (ID). One REG has four REs. An RE is a minimum physical resource defined as one subcarrier×one OFDM symbol. A PCFICH value, which is modulated in quadrature phase shift keying (QPSK), ranges from 1 to 3 or from 2 to 4 according to a bandwidth.

The PHICH carries an HARQ ACK/NACK for uplink transmission. That is, the PHICH is a channel used to deliver an HARQ ACK/NACK for uplink HARQ. The PHICH includes one REG and is scrambled cell-specifically. The ACK/NACK is indicated in one bit and modulated in binary phase shift keying (BPSK). The modulated ACK/NACK is spread with a spreading factor (SF) of 2 or 4. A plurality of PHICHs mapped to the same resources form a PHICH group. The number of PHICHs multiplexed into a PHICH group is determined according to the number of spreading codes. The same PHICH (group) occurs three times, for achieving a diversity gain in the frequency and/or time domain.

A PDCCH is allocated to the first n OFDM symbols of a subframe. n is 1 or a larger integer indicated by the PCFICH. The PDCCH includes one or more control channel elements (CCEs).

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI. Table. 3 shows an example of DCI format.

TABLE 3

| DCI format | Description |
| --- | --- |
| 0 | Resource grants for the PUSCH transmissions (uplink) |
| 1 | Resource assignments for single codeword PDSCH transmissions |
| 1A | Compact signaling of resource assignments for single codeword PDSCH |
| 1B | Compact resource assignments for PDSCH using rank-1 closed loop precoding |
| 1C | Very compact resource assignments for PDSCH (e.g. paging/broadcast system information) |
| 1D | Compact resource assignments for PDSCH using multi-user MIMO |
| 2 | Resource assignments for PDSCH for closed-loop MIMO operation |
| 2A | Resource assignments for PDSCH for open-loop MIMO operation |

TABLE 3-continued

| DCI format | Description |
| --- | --- |
| 2B | Resource assignments for PDSCH using up to 2 antenna ports with UE-specific reference signals |
| 2C | Resource assignment for PDSCH using up to 8 antenna ports with UE-specific reference signals |
| 3/3A | Power control commands for PUCCH and PUSCH with 2-bit/1-bit power adjustments |
| 4 | Scheduling of PUSCH in one UL Component Carrier with multi-antenna port transmission mode |

In general, a DCI format for a UE depends on transmission mode (TM) set for the UE. In other words, only DCI format(s) corresponding to a specific TM, but not all DCI formats configured in the specific TM can be used for a UE configured in the specific TM.

The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space (SS). An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Table 4 shows aggregation levels for definition of search spaces.

TABLE 4

| | Search Space | | Number of PDCCH |
| --- | --- | --- | --- |
| Type | Aggregation level L | Size [in CCEs] | candidates M(L) |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

In order to reduce overhead of blind decoding, the number of DCI formats is defined to be less than the number of kinds of control information transmitted using the PDCCH. The DCI format includes a plurality of different information fields. The kind of each information field, the number of information fields, the bit number of each information field, etc. are changed according to DCI format. In addition, the size of the control information matching the DCI format is changed according to DCI format. An arbitrary DCI format may be used to transmit two or more kinds of control information.

Table 5 shows an example of control information transmitted in DCI format 0. In the following description, the bit size of each information field is only exemplary and is not limited thereto.

TABLE 5

| Information Field | bit(s) |
|---|---|
| (1) Flag for format 0/format 1A differentiation | 1 |
| (2) Hopping flag | 1 |
| (3) Resource block assignment and hopping resource allocation | ceil$\{\log_2(N^{UL}_{RB}(N^{UL}_{RB} + 1)/2)\}$ |
| (4) Modulation and coding scheme and redundancy version | 5 |
| (5) New data indicator | 1 |
| (6) TPC command for scheduled PUSCH | 2 |
| (7) Cyclic shift for DMRS | 3 |
| (8) UL index (TDD) | 2 |
| (9) CQI request | 1 |

The flag field is an information field for distinguishing between format 0 and format 1A. That is, DCI format 0 and 1A have the same payload size and are distinguished by the flag field. The bit size of the resource block allocation and hopping resource allocation field may be changed according to a hopping PUSCH or a non-hopping PUSCH. The resource block allocation and hopping resource allocation field for the non-hopping PUSCH provides ceil$\{\log_2(N^{UL}_{RB}(N^{UL}_{RB}+1)/2)\}$ bits to resource allocation of a first slot within an uplink subframe. Here, $N^{UL}_{RB}$ is the number of resource blocks included in an uplink slot and depends on an uplink transmission bandwidth set in a cell. Accordingly, the payload size of DCI format 0 may be changed according to uplink bandwidth. DCI format 1A includes an information field for PDSCH allocation and the payload size of DCI format 1A may also be changed according to downlink bandwidth. DCI format 1A provides a reference information bit size for DCI format 0. Accordingly, if the number of information bits of DCI format 0 is less than the number of information bits of DCI format 1A, "0" is added to DCI format 0 until the payload size of DCI format 0 becomes equal to the payload size of DCI format 1A. The added "0" is filled in a padding field of the DCI format.

In order to maintain computational load according to blind decoding to a predetermined level or less, all DCI formats are not simultaneously searched for. For example, a UE is semi-statically configured via upper layer signaling so as to receive PDSCH data transmission via a PDCCH according to one of transmission modes 1 to 9. Table 6 below shows a transmission mode for configuration of multiple-antenna technology and a DCI format in which a UE performs blind decoding in the corresponding transmission mode.

TABLE 6

| Transmission mode | DCI format | Search Space | Transmission scheme of PDSCH corresponding to PDCCH |
|---|---|---|---|
| Mode 1 | DCI format 1A | Common and UE specific by C-RNTI | Single-antenna port, port 0 |
|  | DCI format 1 | UE specific by C-RNTI | Single-antenna port, port 0 |
| Mode 2 | DCI format 1A | Common and UE specific by C-RNTI | Transmit diversity |
|  | DCI format 1 | UE specific by C-RNTI | Transmit diversity |
| Mode 3 | DCI format 1A | Common and UE specific by C-RNTI | Transmit diversity |
|  | DCI format 2A | UE specific by C-RNTI | Large delay CDD or Transmit diversity |
| Mode 4 | DCI format 1A | Common and UE specific by C-RNTI | Transmit diversity |
|  | DCI format 2 | UE specific by C-RNTI | Closed-loop spatial multiplexing or Transmit diversity |
| Mode 5 | DCI format 1A | Common and UE specific by C-RNTI | Transmit diversity |
|  | DCI format 1D | UE specific by C-RNTI | Multi-user MIMO |
| Mode 6 | DCI format 1A | Common and UE specific by C-RNTI | Transmit diversity |
|  | DCI format 1B | UE specific by C-RNTI | Closed-loop spatial multiplexing using a single transmission layer |
| Mode 7 | DCI format 1A | Common and UE specific by C-RNTI | If the number of PBCH antenna ports is one, Single antenna port, port 0 is used, otherwise Transmit diversity |
|  | DCI format 1 | UE specific by C-RNTI | Single-antenna port, port 5 |
| Mode 8 | DCI format 1A | Common and UE specific by C-RNTI | If the number of PBCH antenna ports is one, Single antenna port, port 0 is used, otherwise Transmit diversity |
|  | DCI format 2B | UE specific by C-RNTI | Dual laayer transmission, port 7 and 8 or single-antenna port, port 7 or 8 |

TABLE 6-continued

| Transmission mode | DCI format | Search Space | Transmission scheme of PDSCH corresponding to PDCCH |
|---|---|---|---|
| Mode 9 | DCI format 1A | Common and UE specific by C-RNTI | Non-MBSFN subframe: If the number of PBCH antenna ports is one, Single-antenna port, port 0 is used, otherwise If the number of PBCH antenna ports is one, Single antenna port, port 0 is used, otherwise Transmit diversity MBSFN subframe: Single-antenna port, port 7 |
| | DCI format 2C | UE specific by C-RNTI | Up to 8 layer transmission, ports 7-14 |

In particular, Table 6 shows a relationship between a PDSCH and a PDCCH that are configured by a cell-radio network temporary identifier (C-RNTI), and a UE configured to decode a PDCCH using a CRC scrambled to the C-RNTI by an upper layer decodes the PDCCH and the corresponding PDSCH according to each combination defined in Table 6. For example, when the UE is configured in transmission mode 1 via upper layer signaling, the UE decodes the PDCCH in DCI formats 1A and 1 to acquire one of DCI format 1A of DCI and DCI format 1 of DCI.

PDCCH transmission/reception will now be described in more detail now. The eNB may select one of a plurality of DCI formats 1, 2, . . . , and N according to control information to be transmitted to a UE. A cyclic redundancy check (CRC) for error detection is attached to the control information generated according to the DCI format. The CRC is masked with a radio network temporary identifier (RNTI) according to an owner or usage of the PDCCH. In other words, the PDCCH is CRC-scrambled with an identifier (e.g., RNTI). If a C-RNTI, a temporary C-RNTI or a semi-persistent C-RNTI is used, the PDCCH carries UE-specific control information and, if another RNTI (e.g. paging RNTI (P-RNTI), system information RNTI (SI-RNTI), and random access RNTI (RA-RNTI)), the PDCCH carries common control information received by all UEs within a cell. The eNB performs channel coding on the control information to which the CRC is attached to generate coded data. Rate matching according to a CCE aggregation level allocated to a PDCCH format is performed, and the coded data is modulated to generate modulated symbols. The modulated symbols configuring one PDCCH may have one of CCE aggregation levels of 1, 2, 4 and 8. The modulated symbols are mapped to physical resource elements (REs) (CCE to RE mapping). In order to detect a PDCCH, the UE demaps the physical REs to CCEs (CCE to RE demapping). Since the UE is not aware of a CCE aggregation level of the PDCCH to be received, demodulation is performed with respect to each CCE aggregation level. The UE performs rate dematching with respect to the demodulated data. Since the UE is not aware of a DCI format (or a DCI payload size) of control information to be received, rate dematching is performed with respect to each DCI format (or each DCI payload size). The data subjected to rate dematching is subjected to channel decoding according to a code rate and a CRC is checked to detect whether errors occur. If errors do not occur, it is determined that the UE detects a PDCCH thereof. If errors occur, the UE continues to perform BD with respect to other CCE aggregation levels or other DCI formats (or DCI payload sizes). The UE which detects the PDCCH removes the CRC from the decoded data and acquires control information.

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g. frequency position) of "B" and transmission format information (e.g. transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

Reference signal (RS)s may be classified into an RS for demodulation and an RS for channel measurement according to functions of the RSs. A cell-specific RS among RSs defined in the current 3GPP LTE/LTE-A system is used for both demodulation and channel measurement, a UE-specific RS is used for demodulation, and a CSI-RS is used to derive channel state information. RSs are classified into a dedicated RS (DRS) and a common RS (CRS) according to recognition of presence of the RSs. The DRS is known to only a specific UE and the CRS is known to all UEs. A cell-specific RS among RSs defined in the current 3GPP LTE/LTE-A system may be a kind of CRS and a UE-specific RS may be a kind of DRS.

A description will be given of channel state information (CSI) reporting. Open-loop MIMO operating without CSI and closed-loop MIMO operating based on CSI are present in LTE. Particularly, in closed-loop MIMO, each of an eNB and a UE can perform beamforming based on CSI to obtain MIMO antenna multiplexing gain. To obtain CSI from the UE, the eNB instructs the UE to feed back CSI with respect to a downlink signal by allocating a physical uplink control channel (PUCCH) or a physical uplink shared channel (PUSCH) to the UE.

CSI is categorized into a rank indicator (RI), a precoding matrix index (PMI), and channel quality indication (CQI). The RI indicates rank information of a channel, as described above and represents the number of streams that can be received by a UE through the same frequency-time resources. The RI is determined by long term fading of the channel, and thus the RI is fed back to an eNB at a longer period than PMI and CQI.

Second, the PMI is a value in which spatial characteristics of a channel are reflected and indicates a precoding matrix index of an eNB preferred by a UE based on a metric such as SINR. Lastly, the CQI indicates channel intensity and represents a reception SINR that can be obtained by the eNB using the PMI.

In LTE, CSI includes a CQI, PMI and RI although it is not limited thereto, and all or some of the CQI, PMI and RI are transmitted according to the transmission mode of each UE. Periodic transmission of CSI is referred to as periodic reporting and transmission of CSI at the request of an eNB is referred to as aperiodic reporting. In the case of aperiodic reporting, a request bit included in uplink scheduling information transmitted from the eNB is sent to a UE. Then, the UE transmits CSI considering a transmission mode thereof to the eNB through a PUSCH. In the case of periodic reporting, a period and an offset of the period are semi-statically signaled to each UE through a upper layer signal on a subframe basis. Each UE delivers CSI considering the transmission mode thereof to the eNB through a PUCCH in a predetermined period. If uplink data is present in a subframe in which CSI is transmitted, the CSI is transmitted with the uplink data through a PUSCH. The eNB transmits transmission timing information suitable for each UE to each UE in consideration of channel state of each UE, UE distribution in a cell, etc. The transmission timing information includes a period in which CSI is transmitted, an offset, etc. and may be transmitted to each UE through an RRC message.

Figure 4:
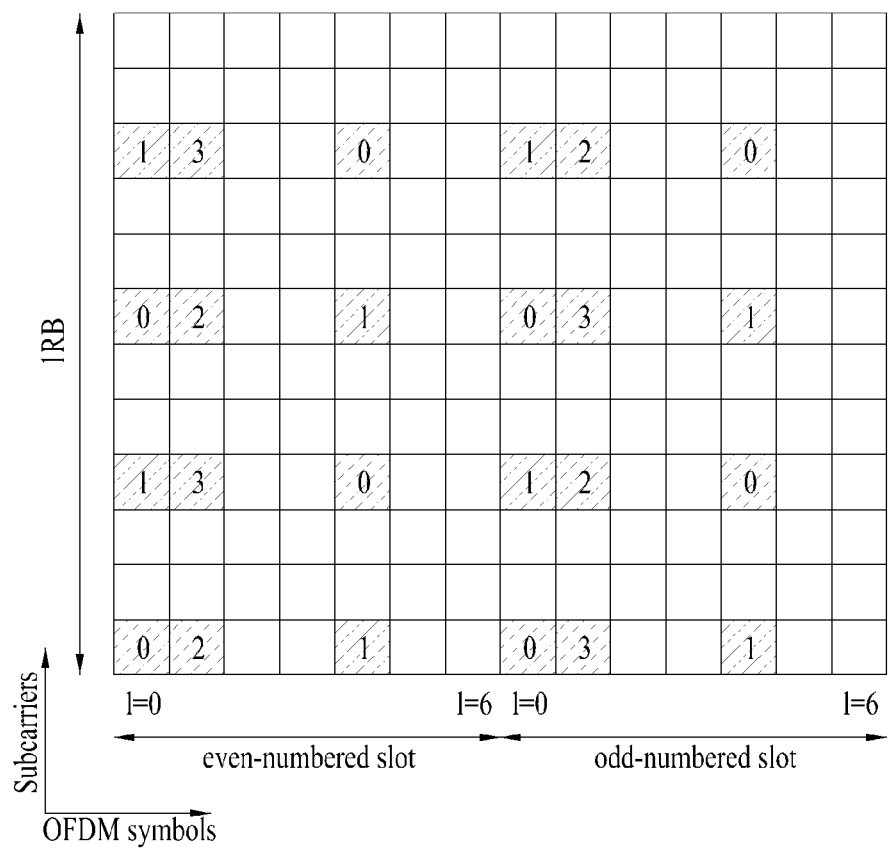
FIG. 4 is a diagram illustrating an example of a configuration of a cell specific common reference signal.

FIG. 4 is a diagram illustrating an example of a configuration of a cell specific common reference signal. In particular, FIG. 4 illustrates a CRS configuration for 3GPP LTE for supporting a maximum of four antennas.

$$k = 6m + (v + v_{shift}) \bmod 6 \qquad \text{Equation 1}$$

$$l = \begin{cases} 0, N_{symb}^{DL} - 3 & \text{if } p \in \{0, 1\} \\ 1 & \text{if } p \in \{2, 3\} \end{cases}$$

$$m = 0, 1, \ldots, 2 \cdot N_{RB}^{DL} - 1$$

$$m' = m + N_{RB}^{max,DL} - N_{RB}^{DL}$$

In Equation 1, k denotes a subcarrier index, l denotes a symbol index, p denotes an antenna port index, and $N^{max,DL}_{RB}$ is a maximum downlink bandwidth configuration represented as an integer multiple of $N^{RB}_{sc}$.

Variables v and $v_{shift}$ define positions in the frequency domain for different RSs and v is given according to Equation 2 below.

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases} \qquad \text{Equation 2}$$

Here, $n_s$ is a slot number in a radio frame and cell-specific frequency shift is given according to Equation 3 below.

$$v_{shift} = N_{ID}^{cell} \bmod 6 \qquad \text{Equation 3}$$

Referring to FIG. 4 and Equations 1 and 2, the current 3GPP LTE/LTE-A standard requires a cell-specific CRS used for demodulation and channel measurement among various RSs defined in a corresponding system to be transmitted over all downlink bands of a carrier in all DL subframes. In addition, the cell-specific CRS is also used to demodulate a downlink data signal in the 3GPP LTE/LTE-A system and thus is transmitted through all antenna ports for downlink transmission.

The cell-specific CRS is used for tracking in which a UE acquires frequency synchronization and time synchronization of a carrier used in communication between an eNB and the UE, maintains the time synchronization, and then compensates for frequency offset, as well as for channel state measurement and data demodulation.

Figure 5:
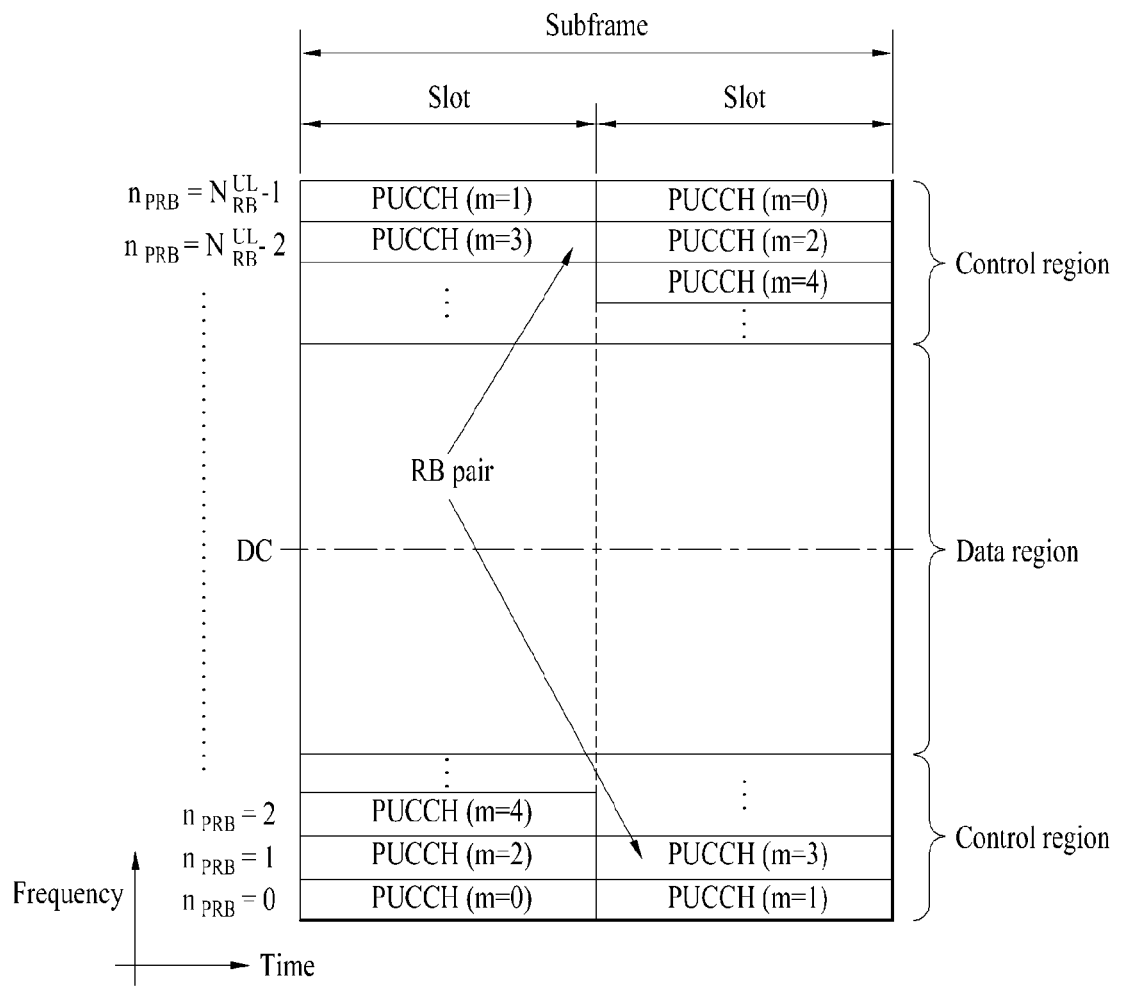
FIG. 5 is a diagram illustrating an example of an uplink subframe structure used in a wireless communication system.

FIG. 5 is a diagram illustrating an example of an uplink subframe structure used in a wireless communication system.

Referring to FIG. 5, a UL subframe may be classified into a control region and a data region in the frequency domain. One or more physical uplink control channels (PUCCHs) may be allocated to the control region in order to carry uplink control information (UCI). One or more physical uplink shared channels (PUSCHs) may be allocated to the data region of a UL frame in order to carry user data.

In the UL subframe, subcarriers far from a direct current (DC) subcarrier are used as a control region. In other words, subcarriers positioned at opposite end portions of a UL transmission bandwidth are allocated for transmission of uplink control information. The DC subcarrier is a component that remains after signal transmission and is mapped to a carrier frequency $f_0$ during frequency up-conversion. A PUCCH for one UE is allocated to a PR pair belonging to resources that operate at one carrier frequency, in one subframe, and RBs belonging to the RB pair occupy different subcarriers in each of two slots. It is said that the RB pair allocated to the PUCCH is frequency-hopped over a slot boundary. However, when frequency hopping is not applied, the RB pair occupies the same subcarriers.

The PUCCH may deliver the following control information.

Scheduling request (SR): This is information requesting UL-SCH resources. An SR is transmitted in on-off keying (OOK).

HARQ ACK/NACK: This is a response signal to a DL data packet received on a PDSCH, indicating whether the DL data packet has been received successfully. A 1-bit ACK/NACK is transmitted as a response to a single DL codeword and a 2-bit ACK/NACK is transmitted as a response to two DL codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel state information (CSI): feedback information regarding a DL channel. Multiple input multiple output (MIMO)-related feedback information includes a rank indicator (RI) and a precoding matrix indicator (PMI).

Hereinafter, device-to-device (D2D) communication will be described.

In the present invention, D2D communication refers to a method for direct communication between UEs without passing through an eNB in a situation such as a case in which a channel state between two or more UEs is good or UEs are adjacent to each other. In this case, each UE exchanges data via direction communication but the D2D communication according to the present invention is different from Bluetooth communication, infrared communication, etc. for exchanging data between UEs without participation of an eNB in that predetermined control information for D2D communication is provided by an eNB.

In the case of client cooperative communication, a UE B that facilitates communication of another UE receives data to be transmitted to an eNB by a UE A and transmits the data to the eNB or the eNB receives data to be transmitted to the UE A and transmits the data to the UE A. In this case, in a system bandwidth, single-direction communication or two-way communication between UEs is performed. Accordingly, client cooperative communication is an example of D2D communication. The client cooperative communication may be used for uplink transmission via cooperation between UEs and may also be used for downlink transmission via cooperation between an eNB and a UE, cooperation between eNBs, or cooperation between antennas of a distributed antenna system (DAS).

As described above, in general, the UE A may exchange data and/or control information with the eNB through the UE B or may directly exchange data and/or control information with the eNB according to a situation. That is, in consideration of a channel situation with the eNB and a channel situation with the UE B, the UE A can exchange data directly with the eNB. In this case, the data and/or control information that are directly exchanged with the eNB may be the same as or different from the data and/or control information that are exchanged with the eNB through the UE B.

A wireless communication system can simultaneously support direct communication and client cooperative communication or can support only one of direct communication and client cooperative communication. When the wireless communication system simultaneously supports direct communication and client cooperative communication, messages for requesting direct communication and client cooperative communication may be different or the same.

Direct communication between UEs or the client cooperative communication may be used interchangeably with the terms "D2D communication/MS-to-MS (M2M) communication", "peer-to-peer (P2P) communication", or the like. Hereinafter, for convenience of description, these are collectively called "D2D communication" in the present invention. In addition, in this specification, "D2D device" refers to a UE for supporting D2D communication.

The present invention proposes a method for exchanging D2D control information between D2D devices using a legacy DL-SCH in D2D communication.

Figure 6:
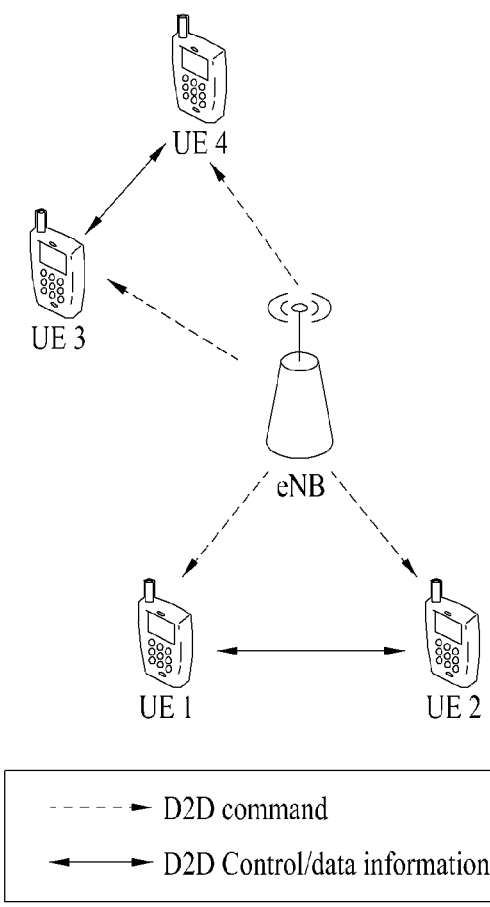
FIG. 6 is a diagram of a network configuration according to an embodiment of the present invention.

FIG. 6 is a diagram of a network configuration according to an embodiment of the present invention. When an eNB issues D2D commands to a UE1 and a UE2 to perform D2D communication between the UE1 and the UE2, the UE1 and the UE2 may initiate D2D communication between the UE1 and the UE2. Similarly, upon receiving a D2D from the eNB, a UE3 and a UE4 may initiate D2D communication between the UE3 and the UE4.

Communication between an eNB and a UE has a rule for transmitting and receiving a control signal to and from the eNB and the UE according to the LTE-A standard but a detailed rule for transmitting and receiving a control signal between D2D devices in D2D communication is not yet clear. Accordingly, the present invention proposes a method for allocating a D2D control signal to a legacy downlink data region (DL-SCH or PDSCH).

First, according to an embodiment of the present invention, an eNB transmits D2D initial operating information to each UE via an upper layer (e.g. radio resource control (RRC)) at a D2D start time. Examples of the initial operating information may include a D2D bandwidth, a D2D transmission/reception period, an (initial) antenna port, and an (initial) demodulation reference signal (DMRS) cyclic shift (CS). In this case, a system bandwidth may be partially or entirely allocated as the D2D bandwidth. However, when the entire system bandwidth is allocated as the D2D bandwidth, an entire or partial D2D bandwidth allocated for communication between an eNB and a UE at a specific time point may be used for communication with an eNB.

Then D2D devices need to indicate/recognize their presence via transmission/detection of a discovery signal between the D2D devices and to transmit a transmission/reception control channel. In a D2D situation, an eNB may indicate positions of a control channel and a data channel via an upper layer signal, and D2D devices may transmit the control channel and the data channel at the position. Information that the control channel needs to include may include at least one of a modulation coding scheme (MCS) level, a hybrid-automatic repeat and request (HARQ) indicator, redundancy version (RV), demodulation reference signal (DMRS) cyclic shift (CS), and transmit power control (TPC).

According to an embodiment of the present invention, a control channel transmitted between D2D devices may be transmitted to a downlink data region (PDSCH). The control channel may be configured according to one resource unit obtained by grouping a plurality of REs and called a resource unit (RU) according to an embodiment of the present invention. The RU may be a set of physically consecutive REs or REs that are distributed at a predetermined interval. According to D2D, communication is performed using a partial specific bandwidth (hereinafter, referred to as a D2D bandwidth) of an entire system bandwidth. In this regard, it is necessary to limit a control channel of the D2D bandwidth to a specific bandwidth (or a specific RU bandwidth) in terms of simplification of control channel detection. In order to select a region to which a control channel is to be allocated, a D2D device at a transmitter side transmits an RS used to measure a channel state, and a D2D device at a receiver side reports a channel quality indicator (CQI) as an RS reception result to an eNB to facilitate selection (specification of a control channel of D2D bandwidth) of a region to which the control information is to be allocated. As a detailed selection method, the eNB may (1) select and indicate a most optimal 1 RU and (2) indicate an RU group including a plurality of candidate RUs via an upper layer signal in consideration of D2D performance and network interference influence based on overall CQI. In particular, although a method (a grouping method) for indicating an RU group can specify a size of an RU group separately from a size of a CQI feedback subband RB, an embodiment of the present invention proposes a method for indicating an RU group with the same size as a size of the CQI feedback subband RB. This is because CQI feedback is received in units of subband RBs.

A first method for indicating a most optimal 1 RU is advantageous for simplifying a D2D procedure. A second method for indicating an RU group is advantageous in terms of performance because a D2D UE can selectively transmit an RU advantageous for transmission from a candidate group or can acquire a diversity gain while varying an RV at each transmission time point but is disadvantageous in that a separate procedure for selecting an RU is required.

The CSI-RS transmission and the CQI reporting procedure for selection of a control information region (allocation of a control channel) may be omitted. In this case, an eNB may randomly designate a control RU in consideration of overall network status.

Since antenna port and resource allocation of the control information for D2D are given via an upper layer signal, it may be expected that the length of a DCI format to be transmitted between D2D devices is 25 to 30 bit(s). The length is a short length in consideration of the fact that the length of a shortest DCI format 0 of the DCI format is 35 to 43 bit(s).

In addition, the control information may be transmitted via QPSK and transmitted in a combination of 1, 2, 4, and 8 RUs according to an aggregation level.

During transmission of an aggregation level value of a control channel, an eNB may indicate an accurate aggregation level value or indicate a set (e.g., {1}, {8}, {1, 2}, {2, 4}, {4, 8}, {1,2,4}, {2,4,8}, and {1,2,4,8}) of permitted aggregation level values. In this case, when a bit number indicated via RRC is limited, the number of sets of aggregation level values may be indicated by selecting only the number of sets in bit number. For example, when the number of bits to be indicated via RRC is 2, the number of sets to be represented in 2 bits is 4 ($2^2$=4). Thus the eNB may indicate a set of permitted aggregation level values as {1}, {1,2}, {4,8}, and {8} and may correspond one set to each bit according to Table 7.

TABLE 7

| Aggregation level indication bit (2 bits) | Permitted aggregation level value |
| --- | --- |
| 00 | {1} |
| 01 | {1, 2} |
| 10 | {4, 8} |
| 11 | {8} |

In the example described with reference to Table 7, when an aggregation level indication bit is "01", a transmitter/receiver D2D device may use one of 1 and 2 as an aggregation level.

According to another embodiment of the present invention, an aggregation level value is not indicated by an eNB, selection of an aggregation level value is performed by the transmitter D2D device, and the receiver D2D device may perform blind decoding on all aggregation level values.

As described above, a resource allocation (RA) field for D2D devices may be given via an upper layer signal, and thus a space corresponding to an RA field included in a DCI format can instead be used in a different type of field.

For example, the RA field can be used to feedback aperiodic CQI measured via CSI-RS, etc. The D2D device measures CQI in subband units according to entire system bandwidth and reports the CQI via a differential method. Table 8 shows an example of subband unit (size) configuration according to system bandwidth.

TABLE 8

| System Bandwidth, RBs | Subband size, k RBs |
| --- | --- |
| 6-7 | No subband |
| 8-10 | 4 |
| 11-26 | 4 |
| 27-63 | 6 |
| 34-110 | 8 |

As another example, the RA field can also be used as an ACK/NACK field for a data channel received from an opposite D2D device of D2D communication.

In addition, the eNB indicates a control channel allocation method for selection of an RU to which a control channel is allocated via an upper layer signal. It is assumed that a D2D device previously knows a control channel RU band via an upper layer signal. The control channel allocation method will be described with reference to FIG. 7.

Figure 7:
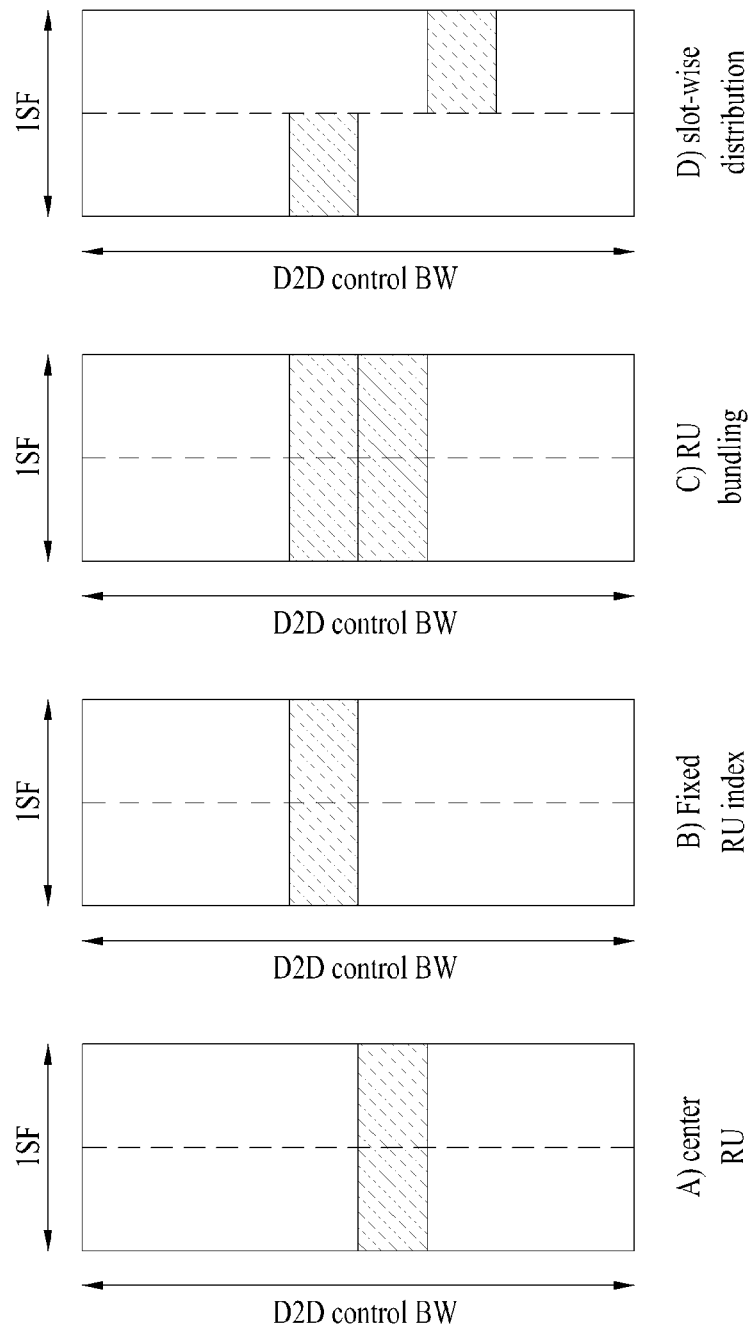
FIG. 7 is a diagram of a method for allocating a control channel between D2D devices according to an embodiment of the present invention.

FIG. 7 is a diagram of a method for allocating a control channel between D2D devices according to an embodiment of the present invention.

As a first example of the control channel allocation method (refer to A) of FIG. 7), a control channel may be allocated to a center RU of D2D bandwidth. As described above, since D2D devices pre-receive information about D2D bandwidth as initial operating information via an upper layer signal, the D2D devices can also know a position of the control channel allocated to a center of the D2D bandwidth. Thus, a signal indicating an RU position of a control channel assigned by an upper layer may be omitted. Thus, the first example may be appropriate for initial transmission of the control channel.

As a second example of the control channel allocation method (refer to B) of FIG. 7), the eNB may indicate an RU index (or an RU group) via an upper layer signal. The eNB may indicate an RU index (or an RU group and an RU index in a group) when a channel state between two or more UEs is good or in consideration of network interference influence. In this case, an indication type may be indicated as an absolute RU index and as a relative value (+n or −m) based on a central RU. As such, an RU index (or an RU group) that is indicated once may be fixed until a change signal is given via an upper layer signal or index-hopped (or group-hopped) by a predefined pattern with a predetermined period. An example of a hopping pattern will be described with reference to FIG. 8.

Figure 8:
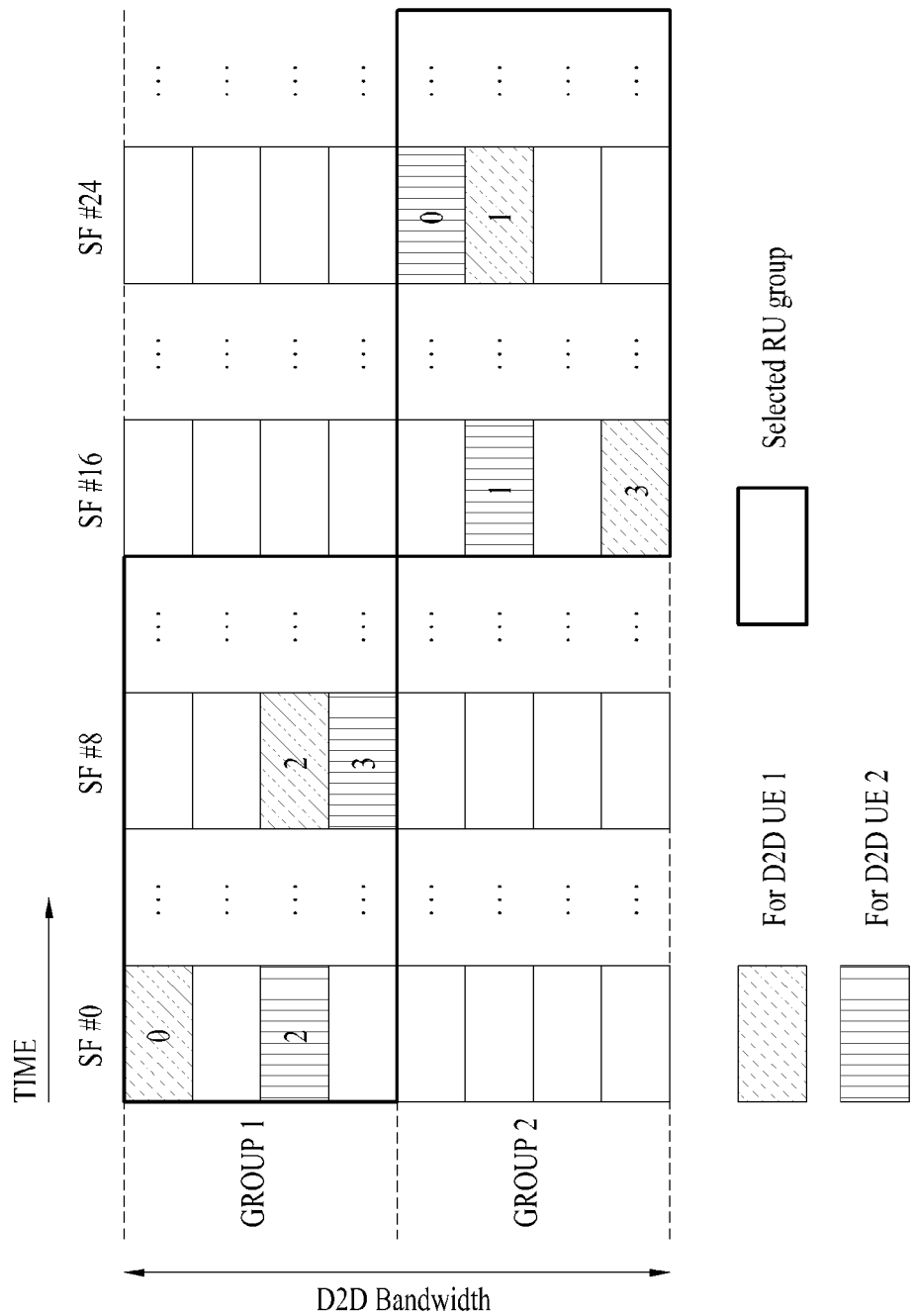
FIG. 8 is a diagram of an index hopping method of a control channel according to an embodiment of the present invention.

FIG. 8 is a diagram of an index hopping method of a control channel according to an embodiment of the present invention.

Referring to FIG. 8, the horizontal axis represents time and the vertical axis represents frequency. An entire D2D bandwidth is divided into two groups (Group 1 and Group 2), and each group is divided into four RUs. In each group, indexes 0 to 3 are allocated to the RUs from above.

In the example of FIG. 8, group hopping is described first. In subframes #0 to #15, Group 1 is allocated. Thus, in subframes #0 to #15, a control channel may be transmitted in an RU included in Group 1. Then, in subframes #16 to #25, the control channel is hopped to Group 2. That is, a control channel in subframes #16 to #25 may be transmitted in an RU included in Group 2.

In the example of FIG. 8, index hopping in a group is now described. In subframes #0 to #15 in which Group 1 is allocated, an RU index of a control channel allocated at each subframe may be changed. That is, an RU index of a control channel in a group may be hopped (e.g. an RU index is changed like "0→2→3→1→0"). That is, the example of FIG. 8 can correspond to a state in which both group hopping and index hopping in a group are activated. However, only one of the two hopping methods is activated and the other hopping method may not be activated.

As a third example of the control channel allocation method (refer to C) of FIG. 7), a control channel may be allocated to a plurality of consecutive RUs in order to ensure reliability for transmission of a control channel when a channel state is degraded.

As a fourth example of the control channel allocation method (refer to D of FIG. 7), an RU index may be differently configured in slot units in a subframe. In this case, the RU needs to be differentiated in slot units. Unlike in C of FIG. 7, an RU index is changed in slot units in one subframe, and compared with B of FIG. 7, it is advantageous to use the same transmission resource while acquiring a diversity gain. An RU index allocated to each designated slot may be fixed until a change signal is given by a separate eNB or D2D or hopped (changed) by a predefined pattern at a predetermined period. In this case, a hopping pattern may be UE-specifically given like an example of hopping guideline below.

In order to prevent resource collision between D2D devices, the hopping pattern may be UE-specifically given. Thus, the hopping pattern may be specified based on any one of a transmitter D2D device and a receiver D2D device. In this case, a hopping function may be UE-specifically given or the function may be cell-specifically given but an initial value of the function may be UE-specifically set. In this case, for UE-specifying, a C-RNTI may be used. Thus, an embodiment of the present invention proposes a hopping method using a C-RNTI.

1) Method for Changing Initial Value of Hopping $$RU_{index}=f(SF_{index},D2D\ mode,cell\text{-}ID,slot_{index},i_{initial})$$

$$i_{initial}=c(C\text{-}RNTI) \qquad \text{Equation 4}$$

That is, like in Equation 4, an RU index hopping function is cell-specifically shared and only an initial value $i_{initial}$ of hopping may be UE-specifically given.

2) Method for Changing Hopping Function

Like in Equation 5, a hopping function is UE-specifically given.

$$RU_{index}=f(SF_{index},D2D\ mode,cell\text{-}ID,slot_{index},C\text{-}RNTI) \qquad \text{Equation 5}$$

The methods proposed together with FIG. 7 may be used alone or used in a combination of two or more methods. For example, like in method A), first control information after discovery signal detection may be transmitted to a central RU, and D2D data may be transmitted via a next allocation method and then transmitted via method D). In addition, methods C) and D) are combined to use higher power than single RU transmission for most reliable control information transmission and to use a plurality of RUs, and positions of control channels may be allocated to be changed in slot units via slot hopping.

As an embodiment of the proposed methods, after a discovery signal is transmitted and received between D2D devices, and an eNB indicates an RU index of a control channel, an allocation method (RU index and whether hopping is performed), and an aggregation level value of a control channel via a higher layer signal. Then, a transmitter D2D device may transmit a control channel according to received information and a receiver D2D device may check a received allocation method, whether hopping is performed, and an aggregation level and restore a control channel to the received RU index position.

As another embodiment of the proposed methods, after a discovery signal is transmitted and received between D2D devices, and an eNB indicates an RU index and an allocation method (RU index and whether hopping is performed) via an upper layer signal. Then a transmitter D2D device may transmit a control channel according to received information and a receiver D2D device may perform blind decoding four times with respect to all possible aggregation levels (AL=1, 2, 4, or 8) via an allocation method indicated by the corresponding RU index.

As another embodiment of the proposed methods, after a discovery signal is transmitted and received between D2D devices, and an eNB indicates an RU index, an allocation method (RU index and whether hopping is performed), and a possible aggregation level set (i.e. {1}, {1,2}, {2,4}, {4,8}, and {8}) according to a channel situation via an upper layer signal. Then a transmitter D2D device may select an appropriate aggregation level value from the received aggregation level set and transmit a control channel and a receiver D2D device may perform blind decoding with respect to a possible aggregation level set via an allocation method designated by a corresponding RU index.

Figure 9:
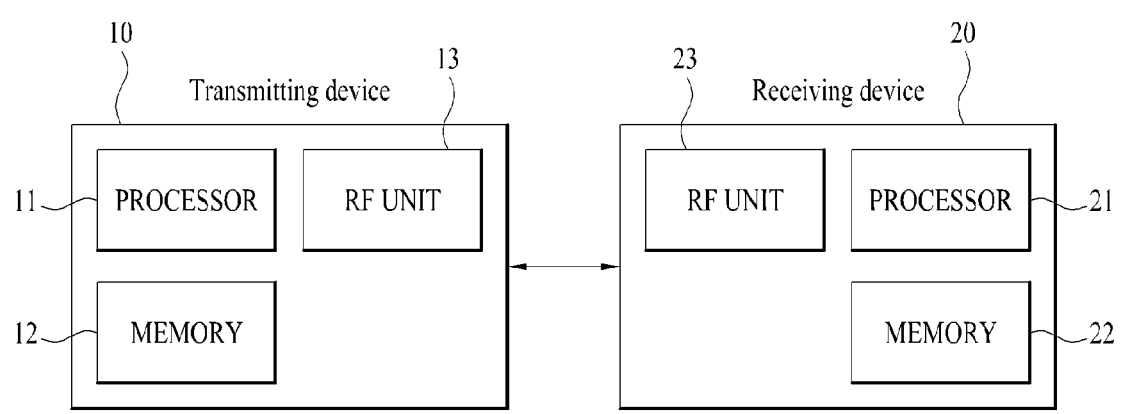
FIG. 9 is a block diagram of components of a transmitting device and a receiving device that perform the present invention.

FIG. 9 is a block diagram of components of a transmitting device 10 and a receiving device 20 that perform the present invention.

The transmitting device 10 and the receiving device 20 include radio frequency (RF) units 13 and 23 for transmitting or receiving a radio signal carrying information and/or data, a signal, a message, etc., memories 12 and 22 for storing various information associated with communication in a wireless communication system, and processors 11 and 21 that are operationally connected to components of the RF units 13 and 23, the memories 12 and 22, etc. to control the components and configured to control the memories 12 and 22 and/or the RF units 13 and 23 such that a corresponding device performs at least one of the aforementioned embodiments, respectively.

The memories 12 and 22 may store programs for processing and control of the processors 11 and 21 and may temporally store input/output information. The memories 12 and 22 may be used as a buffer.

The processors 11 and 21 may generally control an overall operation of various modules in the transmitting device 10 or the receiving device 20. In particular, the processors 11 and 21 may perform various control functions for performing the present invention. The processors 11 and 21 may also be called a controller, a microcontroller, a microprocessor, a microcomputer, etc. The processors 11 and 21 may be implemented by hardware, firmware, software, or a combination thereof. When the present invention is implemented by hardware, application specific integrated circuits (ASICs), digital signal processors (DSPs), digital signal processing devices (DSPDs), programmable logic devices (PLDs), field programmable gate arrays (FPGAs), etc., which are configured to implement the present invention, may be included in the processors 11 and 21. When the present invention is implemented using firmware or hardware, the firmware or the hardware may be configured to include a module, a procedure, a function, or the like for performing functions or operations of the present invention, and the firmware or software for implementing the present invention may be installed in the processors 11 and 21 or may be stored in the memories 12 and 22 and driven by the processors 11 and 21.

The processor 11 of the transmitting device 10 is scheduled by the processor 11 or a scheduler connected thereto, performs coding and modulation of a signal and/or data to be externally transmitted, and then transmits the signal and/or the data to the RF unit 13. For example, the processor 11 performs demultiplexing and channel coding, scrambling, modulation, etc. on a data string to be transmitted to convert the data string into K layers. The coded data string may be called a codeword and is equivalent to a transport block (TB) as a data block provided by a MAC layer. One TB is encoded into one codeword and each codeword is transmitted to the receiving device 20 in the form of one or more layers. For frequency up-conversion, the RF unit 13 may include an oscillator. The RF unit 13 may include $N_t$ ($N_t$ being a positive integer equal to or greater than 1) transmission antennas.

A signal processing process of the receiving device 20 is configured in an opposite way to a signal processing process of the transmitting device 10. Under control of the processor 21, the RF unit 23 of the receiving device 20 receives a radio signal transmitted by the transmitting device 10. The RF unit 23 may include $N_r$ receiving antennas. The RF unit 23 performs frequency down-conversion on each signal received through the receiving antennas to restore a baseband signal. The RF unit 23 may include an oscillator for frequency down-conversion. The processor 21 may perform decoding and demodulation of the radio signal received through the receiving antennas to restore data to be originally transmitted by the transmitting device 10.

Each of the RF units 13 and 23 includes one or more antennas. According to an embodiment of the present invention, under control of the processors 11 and 21, the antenna externally transmit signals processed by the RF units 13 and 23 or receive radio signals from an external source and transmit the radio signals to the RF units 13 and 23. An antenna may also be called an antenna port. Each antenna may correspond to one physical antenna or may be configured by a combination of one or more physical antenna elements. A signal transmitted from each antenna cannot be decomposed by the receiving device 20 any longer. A reference signal (RS) transmitted to correspond to a corresponding antenna defines the antenna in terms of the receiving device 20 and allows the receiving device 20 to perform channel estimation on the antenna irrespective of whether a channel is a single radio channel or a composite channel from a plurality of physical antenna elements including the antenna. That is, the antenna is defined to extract a channel that transmits a symbol on the antenna from the channel to which another symbol on the same antenna is transmitted. An RF unit for supporting a multi-input multi-output (MIMO) function for transmitting and receiving data using a plurality of antennas may be connected to two or more antennas.

According to embodiments of the present invention, a UE operates as the transmitting device 10 in uplink and operates as the receiving device 20 in downlink. According to embodiments of the present invention, an eNB operates as the receiving device 20 in uplink and operates as the transmitting device 10 in downlink. Hereinafter, a processor, an RF unit, and a memory included in the UE are referred to as a UE processor, a UE RF units, and a UE memory, respectively, and a processor, an RF unit, and a memory included in the eNB are referred to as an eNB processor, an eNB RF unit, and an eNB memory, respectively.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

The embodiments of the present invention may be achieved by various means, for example, hardware, firmware, software, or a combination thereof. In a hardware configuration, an embodiment of the present invention may be achieved by one or more application specific integrated circuits (ASICs), digital signal processors (DSPs), digital signal processing devices (DSDPs), programmable logic devices (PLDs), field programmable gate arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

Embodiments of the present invention are applicable to a base station (BS), a user equipment (UE), and other equipments in a wireless communication system.

The invention claimed is:
1. A method for transmitting control information through a control channel by a first device-to-device (D2D) device in a wireless access system for supporting D2D communication, the method comprising:
  receiving information related to a resource region to be used in the D2D communication from a base station (BS),
  wherein the resource region to be used in the D2D communication is allocated in a resource region of a physical downlink shard channel (PDSCH),
  wherein the resource region of the PDSCH is used to receive data from the BS in relation between the BS and the first D2D device; and
  transmitting the control information through the control channel to a second D2D device,
  wherein the control channel is allocated in the resource region to be used in the D2D communication,
  wherein a control channel bandwidth is set as a partial bandwidth of a bandwidth of the allocated resource region.

2. The method according to claim 1, wherein the resource region allocated by the BS is allocated based on a channel quality indicator (CQI) received from the D2D device at the receiver side by the BS.

3. The method according to claim 1, wherein a bandwidth of the allocated resource region is divided into a plurality of unit bandwidths,
  further comprising receiving at least one aggregation level (AL) set indicating the number of the unit bandwidths used for transmission of the control channel from the BS, wherein the transmitting comprises transmitting the control channel based on the at least one AL set.

4. The method according to claim 3, further comprising receiving AL set identification information indicating an AL set to be used for transmission of the control channel of the at least one AL set, from the BS,
wherein the number of at least one AL set is determined based on a bit number of the AL set identification information.

5. The method according to claim 1, wherein the control channel bandwidth is hopped in the allocated bandwidth with a predetermined rule according to a predetermined time interval.

6. The method according to claim 5, wherein the predetermined rule is UE-specific to at least one of the first D2D device and the second D2D device.

7. The method according to claim 6, wherein the predetermined rule is UE-specific with regard to an initial value set for a predetermined hopping function or is UE-specific.

8. The method according to claim 5, wherein the predetermined rule divides the allocated bandwidth into a plurality of bandwidth groups, allocates the control channel bandwidth in a predetermined bandwidth group belonging to the bandwidth groups, and comprises a group hopping rule for hopping the predetermined bandwidth group in the allocated bandwidth.

9. The method according to claim 8, wherein the predetermined rule divides the predetermined bandwidth group into a plurality of unit bandwidths and comprises a bandwidth hopping rule for hopping the unit bandwidths in the predetermined bandwidth group.

10. A method for receiving control information through a control channel by a first device-to-device (D2D) device in a wireless access system for supporting D2D communication, the method comprising:
receiving information related to a resource region to be used in the D2D communication from a base station (BS); and
wherein the resource region to be used in the D2D communication is allocated in a resource region of a physical downlink shard channel (PDSCH),
wherein the resource region of the PDSCH is used to receive data from the BS in relation between the BS and the first D2D device,
receiving the control information through the control channel from a second-D2D device,
wherein the control channel is allocated in the resource region to be used in the D2D communication,
wherein a control channel bandwidth is set as a partial bandwidth of a bandwidth of the allocated resource region.

11. A first device-to-device (D2D) device for transmitting control information through a control channel in a wireless access system for supporting D2D communication, the first D2D device comprising:
a radio frequency (RF) unit; and
a processor configured to control the RF unit,
wherein the processor is further configured to:
receive information related to a resource region to be used in the D2D communication from a base station (BS),
wherein the resource region to be used in the D2D communication is allocated in a resource region of a physical downlink shard channel (PDSCH),
wherein the resource region of the PDSCH is used to receive data from the BS in relation between the BS and the first D2D device, and
transmit the control information through the control channel to a second D2D device,
wherein a control channel bandwidth is set as a partial bandwidth of a bandwidth of the allocated resource region.

12. A first device-to-device (D2D) device for receiving control information through a control channel in a wireless access system for supporting D2D communication, the first D2D device comprising:
a radio frequency (RF) unit; and
a processor configured to control the RF unit,
wherein the processor is further configured to:
receive information related to a resource region to be used in the D2D communication from a base station (BS),
wherein the resource region to be used in the D2D communication is allocated in a resource region of a physical downlink shard channel (PDSCH),
wherein the resource region of the PDSCH is used to receive data from the BS in relation between the BS and the first D2D device, and
receives the control information through the control channel from a second D2D device,
wherein a control channel bandwidth is set as a partial bandwidth of a bandwidth of the allocated resource region.

* * * * *